Feb. 9, 1965    J. R. COSBY ETAL    3,169,231
TELEMETERING CIRCUIT

Original Filed Jan. 24, 1957    3 Sheets-Sheet 1

INVENTORS
JAMES R. COSBY.
HERBERT K. JANSSEN

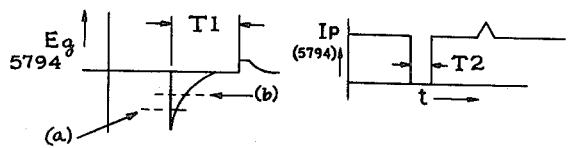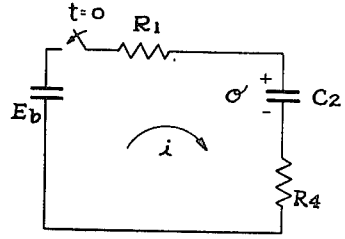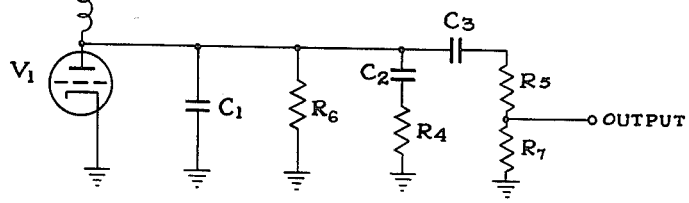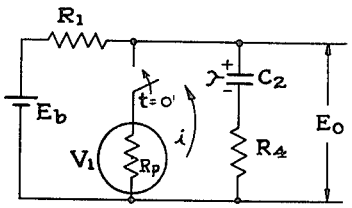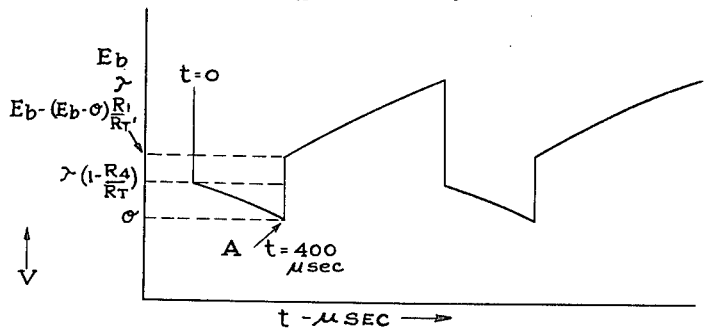

Feb. 9, 1965
J. R. COSBY ETAL  3,169,231
TELEMETERING CIRCUIT
Original Filed Jan. 24, 1957   3 Sheets-Sheet 3
FIG.9.
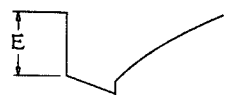
FIG.9A.
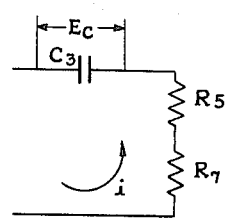
FIG.10.
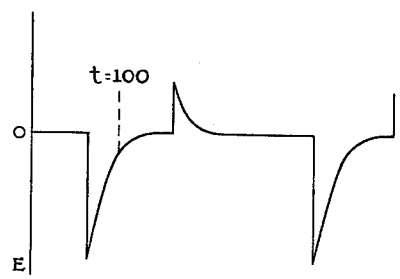
FIG.11.
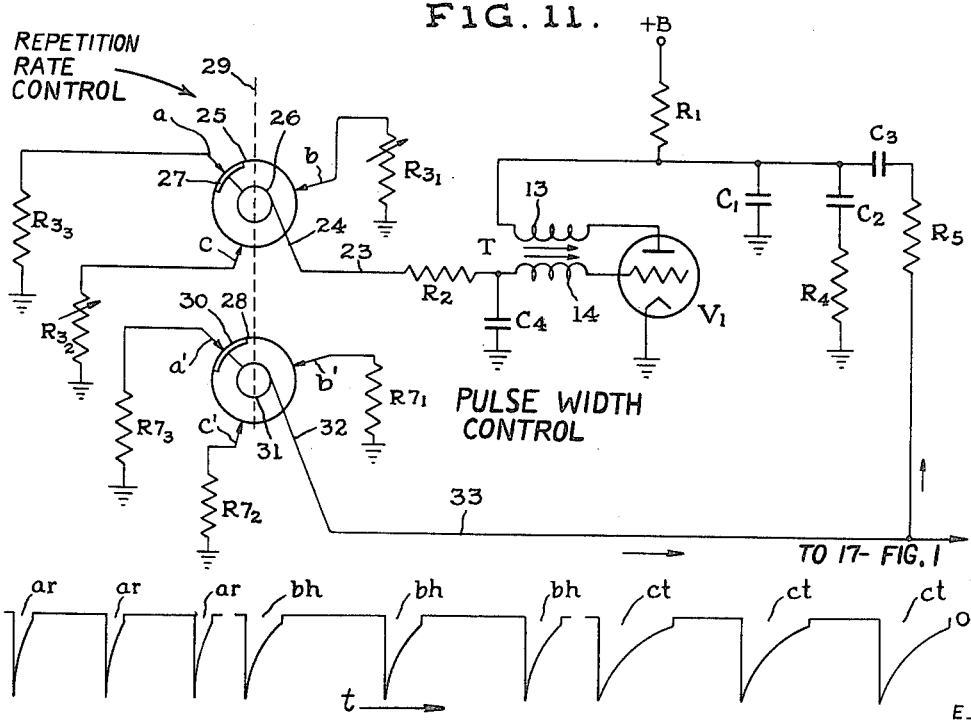
FIG.12.
INVENTORS
JAMES R. COSBY.
HERBERT K. JANSSEN.

United States Patent Office 3,169,231
Patented Feb. 9, 1965

3,169,231
TELEMETERING CIRCUIT
James R. Cosby and Herbert K. Janssen, Baltimore County, Md., assignors to The Bendix Corporation, a corporation of Delaware
Original application Jan. 24, 1957, Ser. No. 636,065, now Patent No. 2,957,146, dated Oct. 18, 1960. Divided and this application May 24, 1960, Ser. No. 31,346
2 Claims. (Cl. 331—65)

This invention relates to improvements in the circuitry of telemetering devices of that type having a sensing and measuring circuit in which a relaxation oscillator is controlled as a function of one or more variables, such as humidity, temperature and pressure, and the repetition rate of the resultant output pulses utilized to pulse-modulate a radio frequency carrier or other transmitting apparatus in transmitting information to a remotely located receiver. The so-called "radiosonde" falls within this class of telemetering devices.

This application constitutes a division of our copending application Serial Number 636,065, filed January 24, 1957, now U.S. Patent No. 2,957,146.

An object of the invention is to provide a telemetering device of the type specified having means whereby the output pulses of the oscillator are given a shape or waveform capable of ready differentiation and are thereupon differentiated into modulating pulses which accurately reflect the values of the parameters being measured and at the same time accommodate the requirements of the transmitting circuitry and the receiver. This gives rise to certain advantages. For example, an air-borne telemetering device incorporating circuitry in accordance with the instant invention may be economically adapted to measure the changing values of different conditions or parameters, such as humidity and temperature, simply by varying the repetition rate of the relaxation oscillator as a function of such changes to pulse-modulate a carrier wave for transmitting the required information to a receiver and recorder located at a ground station, or the said telemetering device may be adapted to measure and transmit information as to changes in the said conditions by varying the repetition rate as aforesaid and in addition vary the length or duration of the pulses for each condition. In the method first noted, where the repetition rate only is varied, proper reading or interpretation of the mixed received and recorded signals in terms of their respective parameters requires trained personnel and specially-devised charts and evaluators, whereas in the second method where the individual parameters are identified by duration of the pulses, each chain of pulses having an assigned duration can be readily channeled to an individual recorder or other suitable data-recording medium or instrumentation. For example, there could be a recorder for humidity, another for temperature and another for pressure, etc., and the receiver could be provided with channeling circuitry responsive to pulse width.

Among other objects may be mentioned economy of manufacture and flexibility in adapting the circuitry to components such as electron discharge devices which vary in their operating characteristics.

In order to more clearly state the objects and advantages of the invention, reference should be had to the accompanying drawings, wherein.

Figure 1:
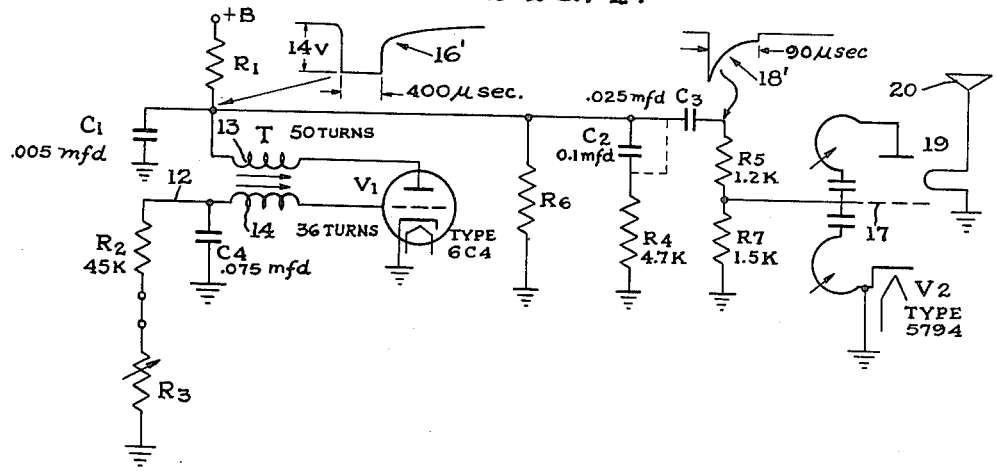
FIGURE 1 is a circuit diagram of a radiosonde in accordance with the invention.

FIGURES 3 to 10, inclusive, show waveforms developed by the circuitry of FIGURE 1 plus certain network arrangements to illustrate how the basic modulation pulse may be differentiated;

FIGURE 11 is a circuit diagram of the audio modulating section of a telemetering device such as a radiosonde incorporating the differentiating circuit of FIG. 1 plus means adapted to generate a chain of signal pulses as a function of a plurality of conditions or parameters being sensed, said pulses being of different length for each condition to facilitate coding and identification at a receiver; and FIGURE 12 illustrates a chain of signals generated by the circuit of FIG. 11.

The use of air-borne radio transmitters for upper air investigation of atmospheric conditions such as pressure, temperature and humidity, has increased over the past decade to a point where mass production at a minimum cost of components has become imperative. Also, there have been expensive projects launched for simplification in the methods of receiving and recording the data to permit processing by non-technical personnel as well as to reduce the time required to place the data in easy-readable form. At the same time it must be recognized that the radiosonde is a precision instrument and the accuracy and dependability of its measuring circuit must be maintained.

Figure 2:
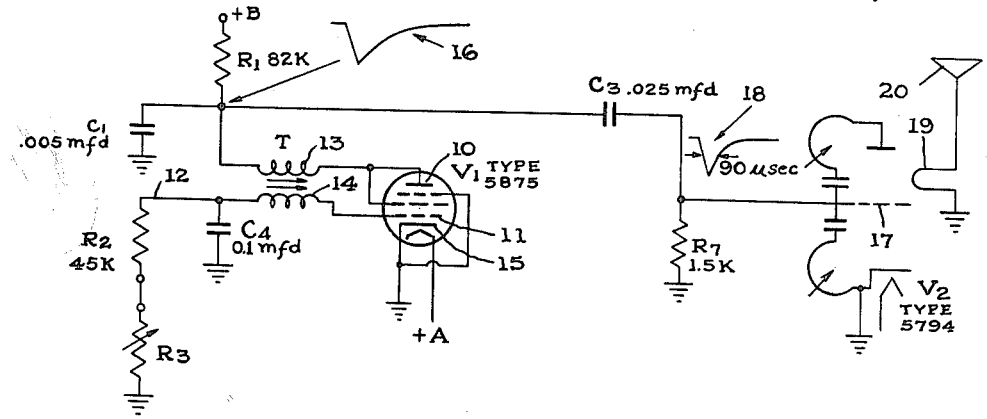
FIGURE 2 is a similar view of a known or prior art device over which the present invention constitutes an improvement.

In FIG. 1 a relaxation oscillator in accordance with the invention is shown coupled to a radio frequency transmitter, the relaxation rate of the oscillator being determined as a function of the conditions being measured. To facilitate an understanding of the invention, a prior art circuit over which the invention constitutes an improvement is shown in FIGURE 2 of the drawings. The transmitted wave, in the example illustrated, is a radio frequency carrier having a frequency of 1680 megacycles per second, pulse-modulated at an audio frequency in the range of from zero to 200 cycles per second by a relaxation oscillator. These frequencies are a matter of choice, however, and may be selected to meet specifications. The oscillations whose repetition frequency constitute modulation pulses representative of the condition or conditions being measured are generated in a thermionic vacuum tube V, which is a medium Mu, high transconductance pentode, connected in circuit as a triode; it may be of the type commercially designated as the 5875 or 6AB4. These tubes are built to meet specifications requiring sharp cut-off and other special characteristics; their cost is relatively high, and in addition to the advantages of improved flexibility in modulation and signal transmission above noted, the present invention provides a telemetering circuit which will permit replacement of these expensive tubes by one of materially reduced cost without sacrificing the measuring accuracy of the circuit. In order to simplify an explanation of the circuit of FIG. 1, it may be well to first briefly describe the operation of the prior art circuit of FIG. 2.

Referring to FIG. 2, the anode 10 of the blocking oscillator tube $V_1$ is supplied with a potential of appropriate value, say 110 volts, across anode or load resistor $R_1$. The direct current circuit between control grid 11 and ground is completed by way of conductor 12 across fixed reference resistor $R_2$ and condition-responsive element or resistor $R_3$. While only one resistor of the $R_3$ type is shown to simplify the description, it will be obvious that others may be included in the circuit, depending upon requirements, as illustrated for example in the U.S. patent to Cosby No. 2,558,342. Also, to simplify the circuitry, conventional shunt resistors and capacitors have been omitted. The anode and grid circuits of pentode $V_1$ are connected in positive feed-back relationship to generate oscillations in an auxiliary frequency oscillation transformer T, having plate inductor coil 13 and grid coil 14. The direct current resistance path from control grid 11 to ground across resistors $R_2$ and $R_3$ is shunted by a blocking capacitor $C_4$. When the circuit becomes energized, the oscillations generated in coils 13 and 14 increase in magnitude to a point causing the flow of grid current between grid 11 and cathode 15 to develop a negative charge on the ungrounded electrode of capacitor $C_4$, and when this negative charge attains a certain value, the amplifying action of the relaxation oscillator $V_1$ is detemined, whereupon oscillations cease, the flow of charging current to $C_4$ stops and the latter discharges through the associated condition-responsive resistance network (illustrated by $R_3$) until the grid bias swings to a value such that the oscillatory conditions are reestablished and the cycle repeated.

During periods when the blocking oscillator tube $V_1$ is conducting, a voltage drop is produced across resistor $R_1$ which takes generally the waveform shown at 16, and the resultant pulse is shaped by the $C_3$–$R_7$ network and applied to the grid 17 of the radio frequency oscillator $V_2$ in approximately the form shown at 18. The anode circuit of $V_2$ is coupled to a tuned resonant transmission line or tank circuit 19 provided with an antenna 20. The voltage pulses 18 momentarily interrupt the operation of $V_2$ and pulse-modulate the carrier wave as a function of variations in $R_3$.

If it be assumed that $R_3$ is responsive to changes in humidity (although it could be responsive to changes in other ambient conditions such as temperature), its resistance would be high when subjected to low humidity and decrease as the humidity increases. For a more complete description of the operation of measuring circuits of the type shown in FIG. 2, reference may be had to the Cosby Patent No. 2,558,342 above noted.

It is necessary that the pulse length of the radio frequency transmitter be within some specified range, for example between 45 and 125 microseconds. One of the reasons for this is that the impedance presented by the grid of the RF tube $V_2$ varies widely for different tubes as well as the voltage at which the tube becomes again conducting or oscillating. In other words, the cut-on characteristics of the 5794 tube or its functional equivalent usually vary widely. In the conventional circuit of FIG. 2, the required range is attained by selecting a $C_4$ capacitor whose basic charging time falls within the said range.

In the circuit of FIG. 2, in order to produce a waveform 16 of the type which can be differentiated by the network $C_3$–$R_7$, $V_1$ must be a medium Mu high transconductance vacum tube with specially controlled characteristics such as cut-off. Tubes having such characteristics are relatively costly; and by utilizing the circuit of FIG. 1, these tubes may be substituted by a type which is substantially less costly, such as the 6C4, without sacrificing efficiency.

Referring now to FIG. 1, parts which perform essentially the same function as like parts in FIG. 2 have similar reference characters applied thereto. In this circuit, the blocking oscilator tube 5875 of FIG. 2 has been substituted by a low Mu, low transconductance electron discharge device, exemplified by type 6C4, although other types such as the 3A5 are readily available. Actually, any electron discharge device will serve the purpose provided the duration and amplitude of its output pulse equals or exceeds a value necessary for differentiation into a modulating pulse falling within a given range, which can be assumed to be between 45 and 125 microseconds duration and 14 volts in amplitude. With a 6C4 tube, the pulse, prior to differentiation, is approximately 400 microseconds long and 14 volts in amplitude, and after differentiation, its maximum width is about 90 microseconds at 14 volts amplitude.

Differentiation of the output pulse of the 6C4 tube is accomplished by the addition of $C_2$–$R_4$; it is made rectangular primarily by the resistance $R_4$. $R_5$ serves to isolate the effective impedance of $R_7$ and that of the grid of the radio frequency tube 5794, which varies not only with different tubes but also with the manner in which the said tube is loaded through its antenna circuit. The value of $C_1$ should be kept small so that the time constant of $C_1$ times plate resistance is small compared to the duration of the basic blocking oscillator circuit, i.e., the charge-up time of $C_4$ when the 6C4 tube is conducting. Resistor $R_1$ in addition to its primary function, also serves to isolate $V_1$ from the low impedance of the battery. While the 6C4 tube of FIG. 1 is essentially "powered" by the charge which accumulates on $C_2$, since $C_2$ is of much greater capacity than $C_1$, yet if $C_2$ were used without $R_4$, the waveform at 16' would be exponential instead of rectangular. The choice of $R_4$ is relatively unlimited as long as the plate current of $V_1$ is essentially space-charge limited.

Frequency stability of the relaxation circuit with variations in battery voltages may be had by a proper selection of the time constant of $R_1$ and $C_2$.

In regard to $R_6$, the value of this resistance when using the 6C4 type of tube may be infinite, since in the specific circuit of FIG. 1, the desired value of current through the measuring circuit is obtainable by the choice of $R_1$–$C_2$ and the proper design center of T, without utilizing $R_6$. However, a proper choice of $R_1$ and $R_6$ can be such as to assist in fixing the operating point of the 6C4 tube, depending upon the value of the plate voltage. Thus, since it is important to control the current in the measuring circuit element, of which $R_3$ is an example, for a given choice of other circuit components, the value of standby plate voltage may be controlled by the magnitude of $R_1$ and $R_6$.

Figure 3:
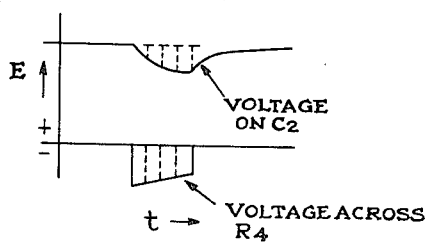
Figure 3A:
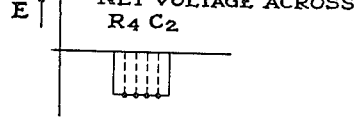

The manner in which the circuit of FIG. 1 operates to produce the waveforms at 16' and 18' may be briefly explained as follows:

Let it be assumed that the 6C4 tube, when conducting, represents a constant-current load $(Zr)$, then when the tube conducts, the capacitor $C_2$ (which is of a value such that it never fully discharges) discharges across the tube, whereupon there will be a voltage drop across the network $C_2$–$R_4$ as illustrated in FIGS. 3 and 3A, and a discharge voltage applied to the grid of the radio frequency tube $V_2$ having the waveform as illustrated in FIG. 4. The positive portion of the wave of FIG. 4 is substantially eliminated by the clipping action of the grid of $V_2$. In FIG. 4, $T_1$ indicates the discharge time of the capacitor $C_2$. The conduction period of the blocking oscillator tube $V_1$ was assumed to be the constant load $Zr$ above. However, since the voltage drop across $V_1$ is not exactly constant, but is of a lower value during the initial period of conduction than during the later period, improved performance is obtained by connecting the output load or radio frequency circuit at the junction of $R_6$–$C_2$, where the pulse is shaped by the combined action of $R_4$–$C_2$. However, a pulse such as shown in FIG. 3 may be satisfactory for differentiation, in which event the output load could be connected at the juncture of $C_2$–$R_4$, as indicated in dotted lines in FIG. 1. FIG. 4A illustrates the action of the radio frequency tube $V_2$ when the voltage pulse 18' is applied to its grid, the current through the tube dropping to zero during the time $T_2$, which latter time equals $(R_5 + R_7) C_3$. If $T_2$ is much less than $(R_4 + Zr) C_2$, here indicated at $T_3$, and $T_3$ is less than $T_1$, then when $R_5$, $R_7$, $C_3$ is connected across $R_4$, the output of the audio oscillator con be differentiated to produce a modulation pulse as explained in connection with FIGS. 3 and 3A.

The following constitutes a mathematical analysis of the circuitry:

The portion of the circuit of FIG. 1 under consideration has been rearranged in FIG. 5 to simplify the explanation.

Since $C_1$ is much less than $C_2$, it may be neglected.
$R_p$=tube plate resistance=$7K\Omega$=a constant.
$R_1$ is much greater than $R_p$.

Referring to FIG. 6, which shows an equivalent circuit for the discharge of the capacitor $C_2$:

$\tau$=initial charge on capacitor $C_2$ prior to $t=0$.

Assume that $V_1$ is cut off and about to conduct at $t=0$, then the equation for the current flowing in the circuit is:

(1) $$i = \frac{\tau}{R_T} \epsilon^{-\frac{t}{R_T C_2}}$$

where (2) $$R_T = R_p + R_4$$

The voltage across capacitor $C_2$ is (3) $$E_{c_2} = \tau \epsilon^{-\frac{t}{R_T C_2}}$$

The voltage across $R_4$ is (4) $$E_{R_4} = -iR_4 = -\frac{\tau}{R_T} R_4 \epsilon^{-\frac{t}{R_T C_2}}$$

Therefore the voltage across the combination $C_2$, $R_4$ may be written as $E_0$.

(5) $$E_0 = E_{c_2} + E_{R_4}$$

$$E_0 = \tau \left( \epsilon^{-\frac{t}{R_T C_2}} - \frac{R_4}{R_T} \epsilon^{-\frac{t}{R_T C_2}} \right)$$

Since $V_1$ conducts for a period of 400 microseconds, the wave shape as determined by Equation 5 corresponds to the first 400 microseconds of the curve depicted in FIG. 7. It was assumed in the above analysis that the plate resistance of tube $V_1$ was constant throughout the conducting period. An analysis of the blocking oscillator circuit used with $V_1$ will show that such is not the case; therefore, $R_p$ should have been written as a function of grid voltage and plate current of $V_1$. The effect of this changing impedance would be a change in the slope of line "A" in FIG. 7. It is possible, through the proper choice of parameters, to have the slope of this line equal to zero. Regardless of what slope this curve attains, there will be no net change in the overall performance of the circuit in question.

Now assume that $V_1$ is about to cut off due to the action of the blocking oscillator, the equivalent circuit for the charging of capacitor $C_2$ is shown in FIG. 8, where $\sigma$=initial voltage across $C_2$ the instant before $t=0$
$R_{T'} = R_1 + R_4$ The current $i$ is (6) $$i = \frac{E_0 - \sigma}{R_{T'}} \epsilon^{-\frac{t}{R_{T'} C_2}}$$

The voltage across capacitor $C_2$ is (7) $$E_{c_2} = E_b - i(R_1 + R_4)$$

$$= E_b - \frac{E_b - \sigma}{R_{T'}} (R_1 + R_4) \epsilon^{-\frac{t}{R_{T'} C_2}}$$

$$E_0 = E_{c_2} - E_{R_4} = E_b - (E_b - \sigma) \frac{R_1}{R_{T'}} \epsilon^{-\frac{t}{R_{T'} C_2}}$$

This equation is combined with Equation 5 to depict the complete curve of FIG. 7.

The voltage waveform shown in FIG. 7 appears across the differentiating network comprised of $C_3$, $R_5$ and $R_6$. This waveform and circuit is shown in FIGS. 9 and 9A. The action of this circuit is as follows:

Let $R_0 = R_5 - R_7$.

(8) $$i = \frac{E}{R_0} \epsilon^{-\frac{t}{R_0 C_3}}$$

(9) $$E_c = E \left( 1 - \epsilon^{-\frac{t}{R_0 C_3}} \right)$$

(10) $$E_{R_0} = E - E_c = -E \epsilon^{-\frac{t}{R_0 C_3}}$$

A plot of this differentiated waveform is shown in FIG. 10.

In FIG. 11, the condition-sensing and relaxation oscillator section of FIG. 1 is shown provided with coacting variable sensing resistors and switch mechanism arranged circuit-wise in a manner such that a plurality of conditions are sensed in sequence, the oscillator generating pulses the repetition rate of which vary with variations in each condition being sensed and the width of which remains constant for each condition but vary for different conditions. Thus each condition may have assigned thereto a pulse having a predetermined distinctive width which may serve as an identifying or coding pulse. This promotes certain advantages. For example, the data pertaining to the various conditions may be transmitted to a receiver having means responsive to pulse width for channeling the data to separate recorders, or if the entire data for a plurality of conditions is received and recorded on a single chart, the data pertaining to each condition may be more readily integrated for identification purposes.

Instead of there being a single condition-sensing resistor $R_3$ as in FIG. 1, there are two in FIG. 11, indicated at $R_{31}$, $R_{32}$, plus a fixed reference resistor $R_{33}$. If, for example, it is desired to sense changes in humidity and temperature and in addition put out a third pulse which may, for example, be utilized as a reference pulse to determine whether or not there has been a change or drift in the oscillator frequency from its assigned frequency during the time a telemetering device is airborne, then the resistor $R_{31}$ could sense humidity, $R_{32}$ temperature, and $R_{33}$ function as the reference resistor. The grid circuit of the oscillator tube $V_1$ is connected by way of conductor 23 and brush 24 to ground across a rotary conductor 25, and any one of a series of contacts $a$, $b$ and $c$ and its associated resistor $R_{31}$, $R_{32}$ and $R_{33}$. The rotary contactor 25 may be driven by a motor or other means, not shown, and is provided with a slip-ring 26 electrically connected to a conductive contactor switch-in segment 27, the latter being engaged or wiped by the contacts $a$, $b$ and $c$ in sequence as the contactor is rotated. Coacting with the motor-driven contactor 25 is a similar rotary contactor 28, the contactors 25 and 28 being connected, as schematically indicated at 29, for rotation in synchronism. A series of differentiating impedance elements in the form of resistors $R_{71}$, $R_{72}$ and $R_{73}$ each has its one terminal grounded and the opposite terminal connected to contacts $a'$, $b'$ and $c'$ and these latter contacts are adapted to successively engage a conductive contact or switch-in segment 30, which is connected to a slip-ring 31. A brush 32 rides on the slip-ring 31 and is connected through the network $R_5$, $C_3$ and the load resistor $R_1$ to the plate supply circuit of the tube $V_1$.

The contacts $a'$, $b'$ and $c'$ engage the segment 30 of the contactor 28 in registration with, or during the same time the contacts $a$, $b$ and $c$ engage the segment 27 of the contactor 25. During the time the contact $a$ rides on the segment 27 and $a'$ rides on the segment 30, the fixed reference resistor $R_{33}$ and differentiating or coding resistor $R_{73}$ are switched into the circuit; and during this period the relaxation oscillator puts out a series of pulses the repetition frequency of which may be checked against that originally set for the said oscillator, or its assigned frequency; if the frequencies are at variance correction must be made to compensate for drift, in a manner well known by those versed in deciphering data sent out by airborne radiosondes. In FIG. 12, these pulses are indicated at $ar$ and are all of the same duration and spaced equally due to the fact that both the resistances $R_{3_3}$ and $R_{7_3}$ are of a fixed value.

When contact $b$ rides on the segment 27 of the rotary contactor 25 and contact $b'$ of the rotary contactor 28 rides on the segment 30, the humidity-sensing element or resistor $R_{3_1}$ and the pulse-coding resistor $R_{7_1}$ are switched into the circuit, and if there is any change in humidity of the ambient air, such change will produce a change in the repetition rate of the oscillator as heretofore described in connection with FIGS. 1 and 2, while at the same time the fixed resistor $R_{7_1}$ in conjunction with the differentiating network $R_5$, $C_3$ will determine the width of the pulse, note the pulses $bh$ in FIG. 12, which are all of the same width.

When contact $c$ rides on the segment 27 of the rotary contactor 25 and contact $c'$ of the rotary contactor 28 rides on the segment 30, the temperature-sensing element or resistor $R_{3_2}$ and the pulse-coding resistor $R_{7_2}$ are switched into the circuit, and during this period if there is any change in temperature of the ambient air, such change will produce a change in the repetition rate of the oscillator while at the same time the fixed resistor $R_{7_2}$ in conjunction with the differentiating network $R_5$, $C_3$ will determine the width of the pulse, note the pulse $ct$ in FIG. 12.

In FIG. 11, no transmitter is shown; it could be a radio frequency carrier as in FIGS. 1 and 2, in which case the audio oscillator output pulses would modulate the carrier both as to repetition rate and time or pulse duration, or transmission could be by wire or other suitable medium.

While the invention is shown in schematic form, its teachings will be readily apparent to those skilled in the art, it being obvious that certain changes and modifications in construction may be necessary to adapt the circuitry to different telemetering requirements.

What we claim is:

1. In a telemetering device, a measuring circuit including an audio oscillator provided with an electron discharge device having input and output electrodes coupled in positive feedback relation to generate sustained oscillations, a direct current leak circuit returning said input electrode to ground, said leak circuit including a plurality of variable resistance elements each responsive to variations in a condition to be measured, a first capacitor, and first switching means sequentially connecting said resistance elements in circuit with said capacitor thereby to determine the repetition rate of the oscillator as a function of changes in the condition being measured, a load resistor in the output electrode circuit of said electron discharge device, a pulse shaping network connected in said output electrode circuit for shaping the output pulses of the audio frequency oscillator into a substantially rectangular waveform, and differentiating means for differentiating said rectangular pulses, said differentiating means including a second capacitor, a plurality of impedances of fixed value and second switching means for connecting a particular one of said impedances in circuit with said second capacitor to provide output pulses of a predetermined effective length depending upon the value of connected impedance, said second switching means being synchronized with said first switching means so that the effective output pulse length identifies each condition being measured.

2. A telemetering device as claimed in claim 1 in which said impedance elements are in the form of linear resistances.

References Cited in the file of this patent
UNITED STATES PATENTS

| 2,418,836 | Hawes | Apr. 15, 1947 |
| 2,509,215 | Craig | May 30, 1950 |
| 2,703,386 | Seney | Mar. 1, 1955 |